United States Patent
Ramsdell et al.

(10) Patent No.: US 9,686,976 B2
(45) Date of Patent: Jun. 27, 2017

(54) VARIABLE METERED AIRLESS APPLICATOR WITH CARTRIDGE

(71) Applicant: BAYER CROPSCIENCE LP, Research Triangle Park, NC (US)

(72) Inventors: Matthew Ramsdell, Raleigh, NC (US); Byron Reid, Raleigh, NC (US); Peter Jardine, Raleigh, NC (US)

(73) Assignee: BAYER CROPSCIENCE LP, Research Triangle Park, NC (US)

( * ) Notice: Subject to any disclaimer, the term of this patent is extended or adjusted under 35 U.S.C. 154(b) by 73 days.

(21) Appl. No.: 14/635,151

(22) Filed: Mar. 2, 2015

(65) Prior Publication Data
US 2016/0255826 A1 Sep. 8, 2016

(51) Int. Cl.
| G01F 11/00 | (2006.01) |
| A01M 25/00 | (2006.01) |
| A01M 21/00 | (2006.01) |
| B65D 83/00 | (2006.01) |
| B67D 7/30 | (2010.01) |

(52) U.S. Cl.
CPC .......... *A01M 25/006* (2013.01); *A01M 21/00* (2013.01); *B65D 83/0005* (2013.01); *B67D 7/301* (2013.01)

(58) Field of Classification Search
CPC ............ B65D 83/0038; B65D 83/0044; B65D 83/0005; A01M 25/006; A01M 21/00; B67D 7/301; B67D 7/30
USPC ............. 222/1, 52, 63, 31, 48, 49, 154–165, 222/469–472, 391, 309, 628, 608, 267, 222/282, 283, 325–328, 287; 604/208, 604/232, 234, 235
See application file for complete search history.

(56) References Cited

U.S. PATENT DOCUMENTS

| 3,507,276 | A | * | 4/1970 | Burgess | .................. | A61M 5/30 604/135 |
| 4,074,831 | A | | 2/1978 | Roach | | |
| 4,498,904 | A | | 2/1985 | Turner et al. | | |
| 5,024,355 | A | * | 6/1991 | Jouillat | .................. | A61F 9/0008 222/162 |
| 5,383,865 | A | * | 1/1995 | Michel | .............. | A61M 5/31556 604/186 |
| 5,433,343 | A | * | 7/1995 | Meshberg | ............. | A61M 15/08 222/154 |
| 5,456,672 | A | | 10/1995 | Diedrich et al. | | |
| 5,516,006 | A | * | 5/1996 | Meshberg | ............. | A61M 15/08 222/162 |

(Continued)

OTHER PUBLICATIONS

Flumatic, Syringe Dispensing gun-Syringe Dispensing gun-Products-Flumatic Liqui . . . , http://www.flumatic.com/ProDetails_240-2019.html (2 pages).

(Continued)

*Primary Examiner* — Lien Ngo
(74) *Attorney, Agent, or Firm* — McBee Moore Woodward & Vanik IP, LLC.

(57) ABSTRACT

The present invention relates to a variable metered amount airless applicator with cartridge. Examples of such an applicator include, for example, syringes and gun-shaped applicators. A variable amount selector is a feature of an embodiment of the applicator. The applicator can be attached to a variety of pass-through devices.

9 Claims, 5 Drawing Sheets

(56) References Cited

U.S. PATENT DOCUMENTS

| | | | | |
|---|---|---|---|---|
| 5,593,390 | A | * | 1/1997 | Castellano .......... G06F 19/3468 128/DIG. 1 |
| 5,609,577 | A | * | 3/1997 | Haber ................. A61M 5/3243 604/110 |
| 5,820,602 | A | * | 10/1998 | Kovelman ............ A61M 5/172 604/156 |
| 5,879,336 | A | * | 3/1999 | Brinon ................. A61M 5/204 604/184 |
| 5,988,452 | A | * | 11/1999 | Dent .................... A61M 5/204 222/309 |
| 6,164,498 | A | * | 12/2000 | Faughey ............. B05B 11/3008 222/153.13 |
| 6,193,698 | B1 | * | 2/2001 | Kirchhofer ....... A61M 5/31551 604/207 |
| 6,375,045 | B1 | | 4/2002 | Ki |
| 6,406,207 | B1 | | 6/2002 | Wiegner et al. |
| 6,585,698 | B1 | * | 7/2003 | Packman ................ A61M 5/24 604/207 |
| 6,793,646 | B1 | * | 9/2004 | Giambattista ....... A61M 5/2066 604/208 |
| 6,957,752 | B2 | | 10/2005 | Py et al. |
| 8,113,390 | B2 | | 2/2012 | Wold et al. |
| 8,292,619 | B2 | | 10/2012 | Peuker et al. |
| 2003/0078496 | A1 | | 4/2003 | Price et al. |
| 2003/0123921 | A1 | | 7/2003 | Abbas |
| 2011/0252695 | A1 | | 10/2011 | Pryor |
| 2012/0065619 | A1 | | 3/2012 | Ahlgrimm |
| 2012/0261029 | A1 | | 10/2012 | Kim |
| 2012/0298694 | A1 | | 11/2012 | Holzmann |
| 2012/0325865 | A1 | | 12/2012 | Forstreuter et al. |
| 2013/0126559 | A1 | | 5/2013 | Cowan et al. |

OTHER PUBLICATIONS

Sterile Multiple-Dose Containers, http://medinstill.com/sterile_multiple_dose_containers.php (2 pages).

Pin-point polyfoil for pharmaceuticals, http://www.webpackaging.com/search/param/q/gel/innovation/2078653/P . . . , (2 pages).

INTACT™ Valve (Dispensing), http://medinstill.com/intact_valve_dispensing.php (2 pages).

Prefilled Syringes: The Rise of the Delivery Device Portfolio, ONdrugDelivery Oct. 2012 Issue No. 36 ISSN-2049-145X, ONdrugDelivery Issue No. 36, Oct. 2012 (57 pages).

Airless, medical-style packs for Juliette Armand's Skin Booster range, http://www.webpackaging.com/search/param/q/gel/innovation/2342835/A . . . , (2 pages).

Press kit 2013 Rexam Healthcare file and product pictures available on www.rexam.com, www.rexam.com/healthcare-healthcare.info@rexam.com Contact : Laurence Quesdeville—laurence.quesdeville@rexam.com—Ph : 01 58 47 56 82 photos credit Rexam—Rexam ©2013, (6 pages).

32 mL Measured Dose Syringe—Total Pharmacy Supply, http://www.totalpharmacysupply.com/browse.cfm/32-ml-measured-dose-s . . . (2 pages).

Browsing Store—Airless Topical Dosing Pen, 7.5 ml (Blue), http://www.totalpharmacysupply.com/browse.cfm/airless-topical-dosing- . . . , (2 pages).

International Search Report mailed May 5, 2016, in counterpart Application No. PCT/US2016/019419.

* cited by examiner

VARIABLE METERED AIRLESS APPLICATOR WITH CARTRIDGE

FIELD OF THE DISCLOSURE

The present disclosure relates generally to an applicator and cartridge for delivering a metered amount of a fluid, and, more particularly, to variable metered dose airless syringes and gun-shaped applicators with cartridges. The present disclosure also relates to methods of use thereof.

SUMMARY

Various embodiments of the present disclosure are directed to an airless applicator. In one embodiment, the airless applicator has a housing with a distal end and a proximal end; an interchangeable tip attachable to the distal end of the housing and in fluid communication with an interior of the housing; a cartridge partially insertable into the housing for slidably and rotatably moving relative to the housing, the cartridge having a pump in fluid communication with the interchangeable tip for dispensing a fluid in the cartridge through the tip by operation of the pump via the sliding of the cartridge; and a variable amount selector at the proximal end of the housing for selecting a predetermined amount of the fluid to be dispensed from the cartridge, wherein the cartridge comprises a moveable plug for preventing air from contacting the fluid in the cartridge when the predetermined amount of the fluid is dispensed, and wherein said variable amount selector comprises a stroke adjuster for varying a length the cartridge slides relative to the housing by rotating the cartridge when it is disposed in the housing. Embodiments of the disclosed applicator can be used to deliver, for example, pesticides, fungicides, insecticides, or any combination thereof.

The applicator of the instant invention may be used, for example, to control or prevent pest infestation. Thus, the invention comprises a method for controlling and/or preventing pest infestation comprising using the applicator to deliver, for example, pesticides, fungicides, insecticides, or any combination thereof.

Embodiments of the disclosed applicator may include syringes and gun-shaped applicators.

These and other details, objects, and advantages of the present disclosure will become better understood or apparent from the following description and drawings showing embodiments thereof.

BRIEF DESCRIPTION OF THE DRAWINGS

Embodiments will hereinafter be described with reference to the accompanying drawings, which have not necessarily been drawn to scale. Where applicable, some features may not be illustrated to assist in the illustration and description of underlying features. Throughout the figures, like reference numerals denote like elements.

DETAILED DESCRIPTION

Embodiments of the disclosed applicator provide numerous advantages. One advantage is accuracy in dispensing a fluid. Another advantage is consistency of a dispensed size or dose. Additional advantages of certain embodiments include, for example, compliance with label regulations, reduction in overapplication or waste, automated application of data capture along with accuracy and reporting improvement thereof, and enablement of real-time data analysis. Embodiments of the disclosed applicator also enhance operator ease of use. Such enhancements include ease of cartridge replacement, ease of switching between different products to be dispensed, and reduction of fatigue or repetitive motion.

In one or more embodiments, the disclosed subject matter relates to an airless applicator for dispensing a preselected amount of a fluid in a controlled manner. The applicator is constructed such that each actuation of the applicator dispenses the preselected fluid amount.

Figure 1:
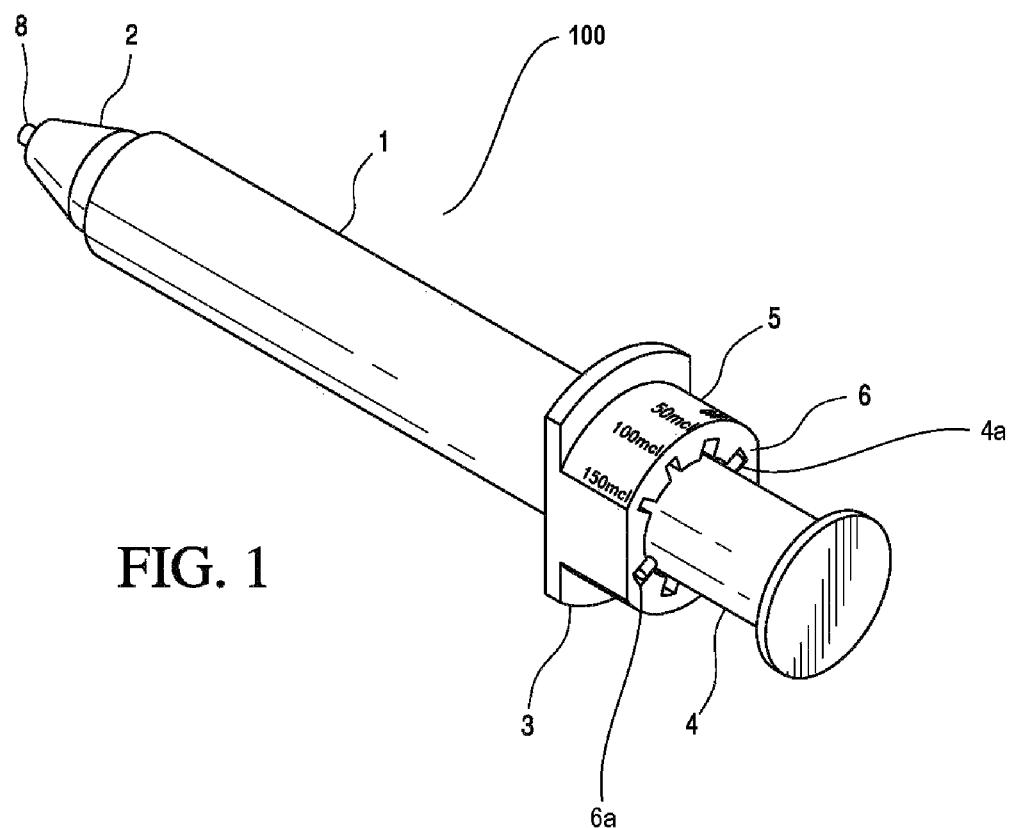
FIG. 1 is a perspective view of a syringe having a variable amount selector, according to one or more embodiments of the disclosed subject matter.
Figure 2:
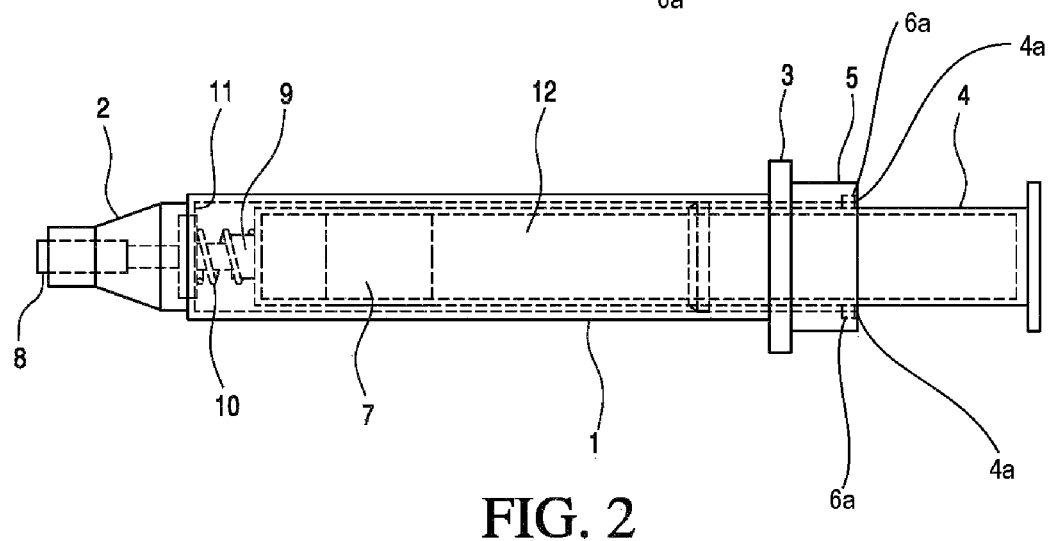
FIG. 2 is a side view of the syringe of FIG. 1.

In an embodiment, as shown in FIG. 1, the airless applicator 100 is a syringe, which has a housing 1 with a distal end 2 and a proximal end 3; a moveable cartridge 4 partially insertable within the housing 1 and having an elongated passageway 12 which serves as a material chamber for a fluid to be dispensed; a variable amount selector 5 and a locking mechanism 6 contained within the proximal end 3 of the housing 1; a moveable plug 7 contained within the cartridge 4 for preventing air from contacting the fluid when it is dispensed. In an example, as illustrated in FIG. 1, the locking mechanism 6 may be located at the proximal end 3 of the housing 1. As illustrated in FIG. 2, the airless syringe also has a pump 9 at the distal tip 2 of the housing 1 to drive fluid dispensing in a conventional manner. The pump 9 can include, for example, a one-way check valve, a stopcock, or any other suitable automated or manually operated valve known to those of skill in the art.

An interchangeable tip 8 is removably attached at the distal end 2 of the housing 1. In an embodiment, the interchangeable tip 8 is a luer lock. In one or more exemplary applications of the airless syringe, the interchangeable tip 8 can be used to attach a tube or hose to the syringe to convey dispensed product from the syringe to a remote location or to dispense material into a space that could not otherwise be reached by the tip of the syringe, for example, by slipping the tube into a crack or other tight area and then injecting material therein.

Figure 3:
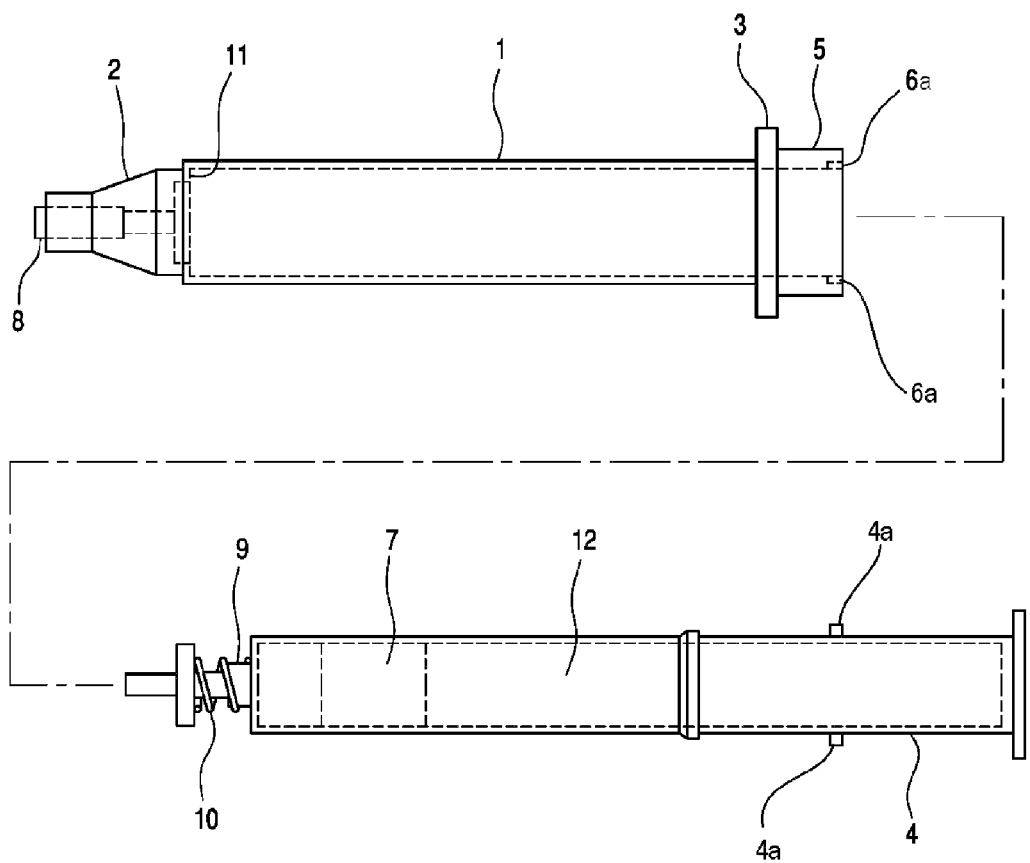
FIG. 3 is an exploded side view of the syringe of FIG. 1.
Figure 7:
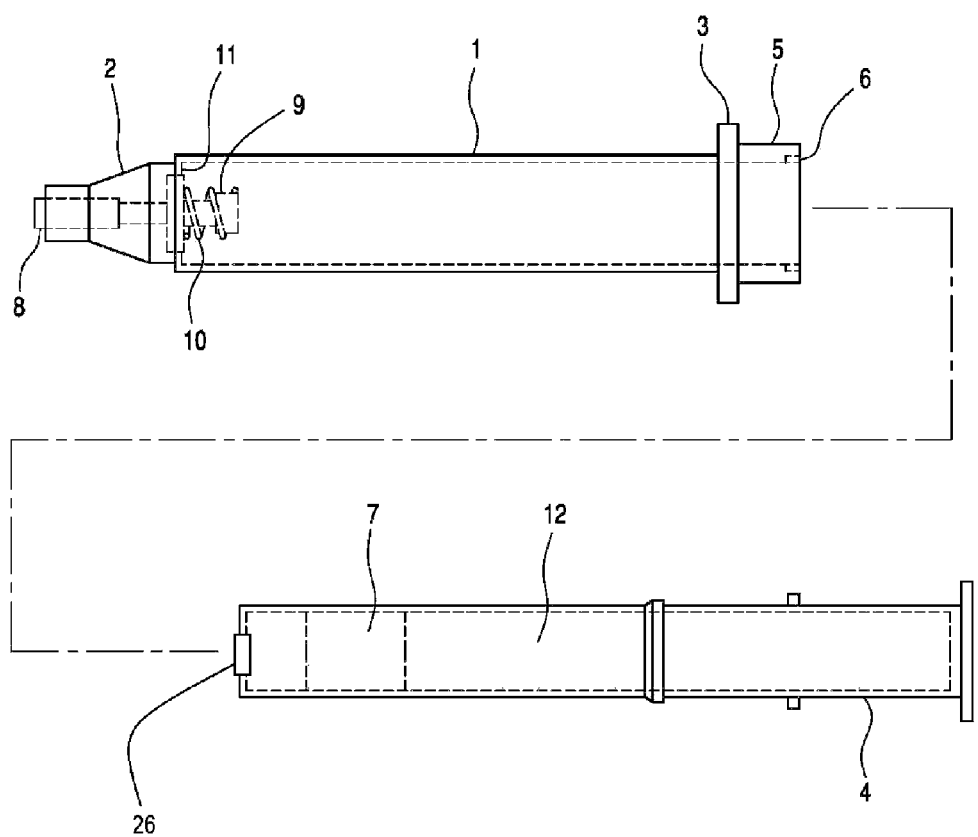
FIG. 7 is an exploded side view of a further embodiment of the disclosed syringe.

In certain embodiments, the pump 9 and a return spring 10 are housed within the housing 1 and attached to the distal end 2. An opening at the distal end of the cartridge 4 allows for the release of the fluid from the cartridge 4 via a valve 26. In this embodiment, the return spring 10 is attached to the housing 1 and not to the removable cartridge 4, as shown in FIG. 7. Alternatively, as shown in FIG. 3, the pump 9 and return spring 10 may be attached to the removable cartridge 4.

The variable amount selector 5 of the airless applicator allows the operator to select a desired amount or dose of fluid to be metered from the applicator from a plurality of predetermined amounts or dosages. For example, the operator can select from one of three metered amounts. In an exemplary embodiment, the variable amount selector 5 includes an axially extending groove 5*a,b,c* for each predetermined amount. (See FIGS. 4-6) As shown in FIG. 1, grooves 5*a-c* can be formed in locking mechanism 6. A corresponding protrusion 4*a* on the cartridge 4 fits within a selected groove 5*a-c* and can travel within the groove in an axial direction of the syringe as the cartridge 4 slides in the housing 1. The depth of each groove 5*a-c* of the variable amount selector 5 corresponds to an amount of travel of the cartridge 4 (and, in turn, the length of the stroke of the pump 9) required to provide the selected amount of fluid. Thus the groove limits the amount of travel of the cartridge 4 thereby preventing the operator from dispensing a larger amount than desired. After depression of the cartridge in the axial direction to dispense a desired amount, a return spring 10 within the body of the applicator forces the cartridge 4 to return to its initial axial position in preparation for dispensing the next desired amount. The operator may engage the variable amount selector 5 by twisting the cartridge 4 (i.e., by rotating the cartridge with respect to the housing 1 in a circumferential direction of the syringe) from the "off" position shown in FIGS. 1-2 (in which the cartridge 4 is unable to slide in the axial direction because it is locked in groove 6*a*) to the desired amount when the cartridge 4 is in the initial axial position. The variable amount selector 5 may be constructed such that the cartridge protrusions 4*a* cannot be moved to different grooves when the cartridge 4 is not in the initial axial position, for example, to prevent accidental changes in the desired amount while the cartridge 4 is being depressed. In this manner, an applicator that can dispense multiple sequential amounts can also administer multiple amounts of different volumes. Embodiments of the applicator which feature a variable amount selector include syringes and gun-shaped applicators (variable amount selector not shown in FIG. 9).

Yet another advantage of the applicators of the disclosed subject matter is that they will retain the substance for dispensing in a sealed, airless condition within the sealed chamber of the cartridge, thereby allowing the applicator to dispense multiple doses over any desired period of time while continuously maintaining the substance in a sealed, sterile condition throughout such desired period of use.

Figure 4:
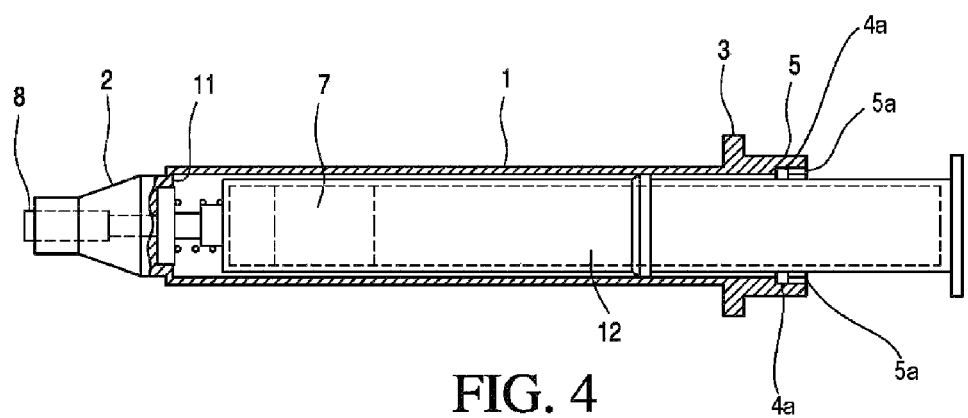
FIG. 4 is a partial cross-sectional view of the syringe of FIG. 1 with the variable dosing selector in the 50 µL position.
Figure 5:
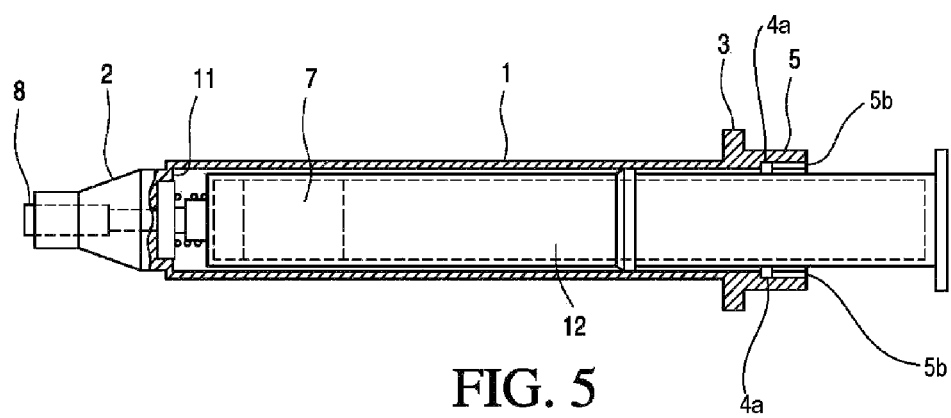
FIG. 5 shows a partial cross-sectional view of the syringe of FIG. 1 with the variable dosing selector in the 100 µL position.
Figure 6:
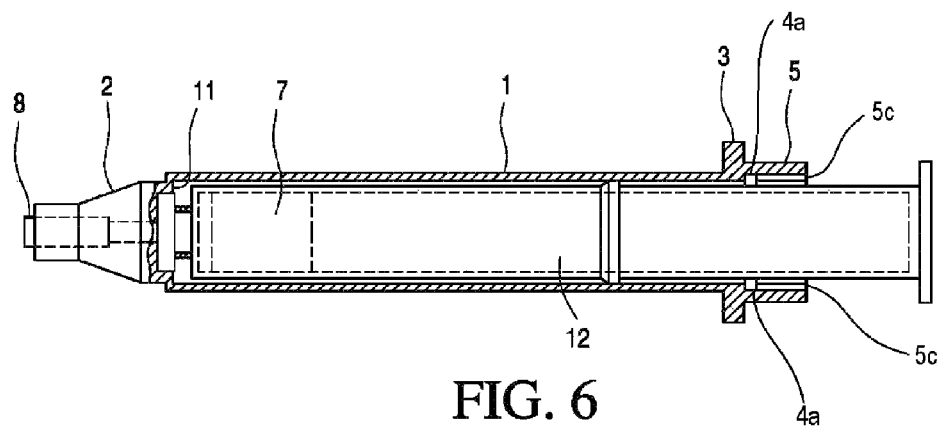
FIG. 6 is a partial cross-sectional view of the syringe of FIG. 1 with the variable dosing selector in the 150 µL position.

In one embodiment, the variable amount selector 5 may be set to dispense 50 µL, 100 µL, or 150 µL of fluid. As illustrated in FIG. 4, the 50 µL amount has been selected, and thus the cartridge 4 is stopped at the distal end of the groove 5*a* of the variable amount selector 5 corresponding to 50 µL. As illustrated in FIG. 5, the 100 µL amount has been selected, and thus the cartridge 4 is stopped at the distal end of the groove 5*b* of the variable amount selector 5 corresponding to 100 µL. As illustrated in FIG. 6, the 150 µL amount has been selected, and thus the cartridge 4 is stopped at the distal end of the groove 5*c* of the variable amount selector 5 corresponding to 150 µL.

The grooves at the distal end of the variable amount selector 5 may be measured to correspond to amounts besides 50 µL, 100 µL, or 150 µL. In an embodiment, the grooves may be measured to correspond to, for example, 1 mL, 3 mL, and 5 mL. In another embodiment, the grooves may be measured to correspond to any three discrete volumetric amounts.

For any of the embodiments disclosed herein, the housing 1 of the applicator 100 may be constructed of, for example, glass, plastic, polypropylene, polycarbonate, etc. or any material that is capable of holding a cartridge. The housing 1 may be marked to indicate volume in, for example, microliters or other volumetric indicators. The cartridge 4 for any of the embodiments disclosed within may be constructed of, for example, plastic, polypropylene, polyethylene, glass, polycarbonate, etc., or any material that is capable of holding a volume of fluid. The shape of the cartridge 4 may match the profile of the housing 1 of the applicator 100. The cartridge 4 may also be marked to indicate volume delivered in, for example, microliters and the like.

In an example and without limitation, the housing of the applicator may hold a volume in the range of about 1-50 mL, or other desired range, and the pump 9 and moveable plug 7 may accurately dispense through axial displacement one of three discrete volumetric amounts. The precise volume of substance displaced is a function of the travel length of the moveable plug 7 when the pump 9 is actuated, times the area of the moveable plug 7; therefore, the total volume of fluid displaced is limited by the diameter and distance traveled of the moveable plug 7 as well as the remaining length in the housing 1 of the applicator. The precise volume of fluid displaced is selected using the variable amount selector 5.

The applicator may have a return spring 10 between the cartridge 4 and an interior base 11 located within the housing 1. By using the base 11, with or without return spring 10, a consistent amount of volume can be delivered as the moveable plug 7 moves closer to the distal tip 2 with each delivery of fluid or other substance by actuation of pump 9.

The moveable plug 7 may be shaped to correspond to the interior shape of the cartridge 4 so that all of the substance may be dispensed.

In one embodiment, in operation the cartridge 4 is prefilled with a volume of substance and the moveable plug 7 is inserted into the cartridge 4, creating an airtight seal. Then the cartridge 4 is inserted into the housing 1. The cartridge 4 may be advanced with accuracy to deliver precise amounts until the moveable plug 7 bottoms out at the distal tip 2 of the housing 1. The fluid dispensed out of the distal end is equal to the volume displaced by the moveable plug 7. The dispensing accuracy is independent of the size, shape, and tolerance of the housing 1.

The cartridge 4 may be graduated for a specific volume or the cartridge 4 may be clear and marked with graduations.

When the shape of the moveable plug 7 is aligned with the passageway 12, the moveable plug 7 moves within the passageway 12. In an alternative embodiment, also illustrated in FIG. 2, the cartridge 4 may extend beyond the proximal end 3 of the housing 1.

The cartridge 4 may be any shape that provides enough travel length to dispense a precise amount of fluid.

The cartridge 4 may be controlled manually, or by any other means as described above herein. Such control of the cartridge 4, in this and other embodiments disclosed herein, provides for precise, repeatable delivery of the desired amount of fluid.

Figure 8:
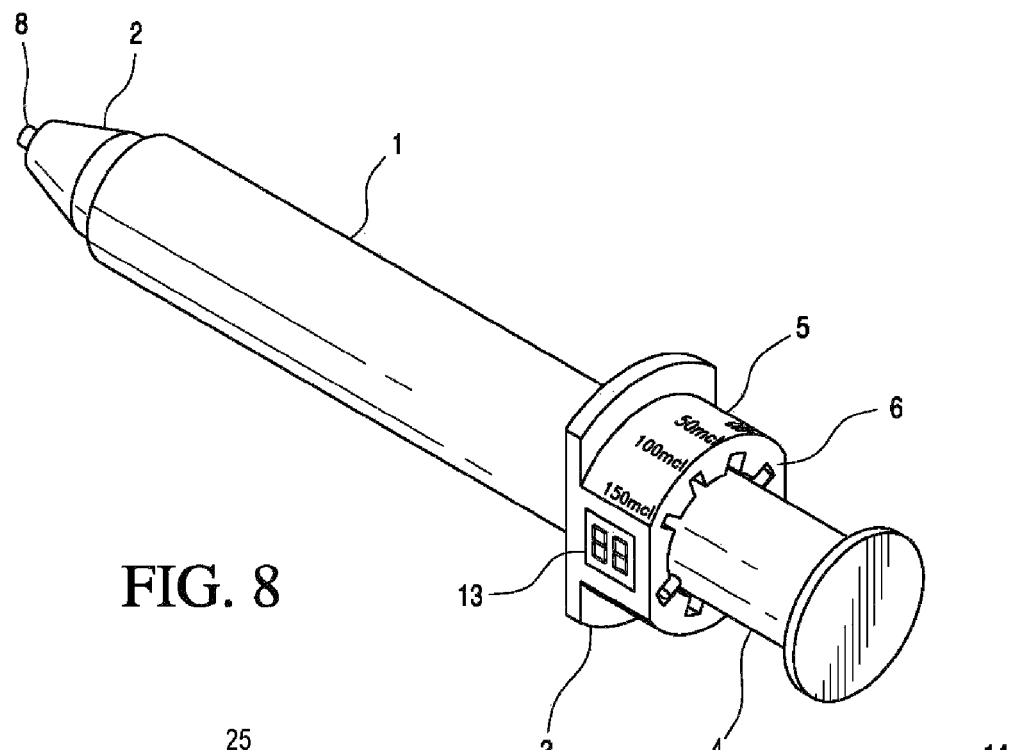
FIG. 8 is a perspective view of a still further embodiment of a disclosed syringe showing the display counter and different adjustments of the variable dosing selector.
Figure 9:
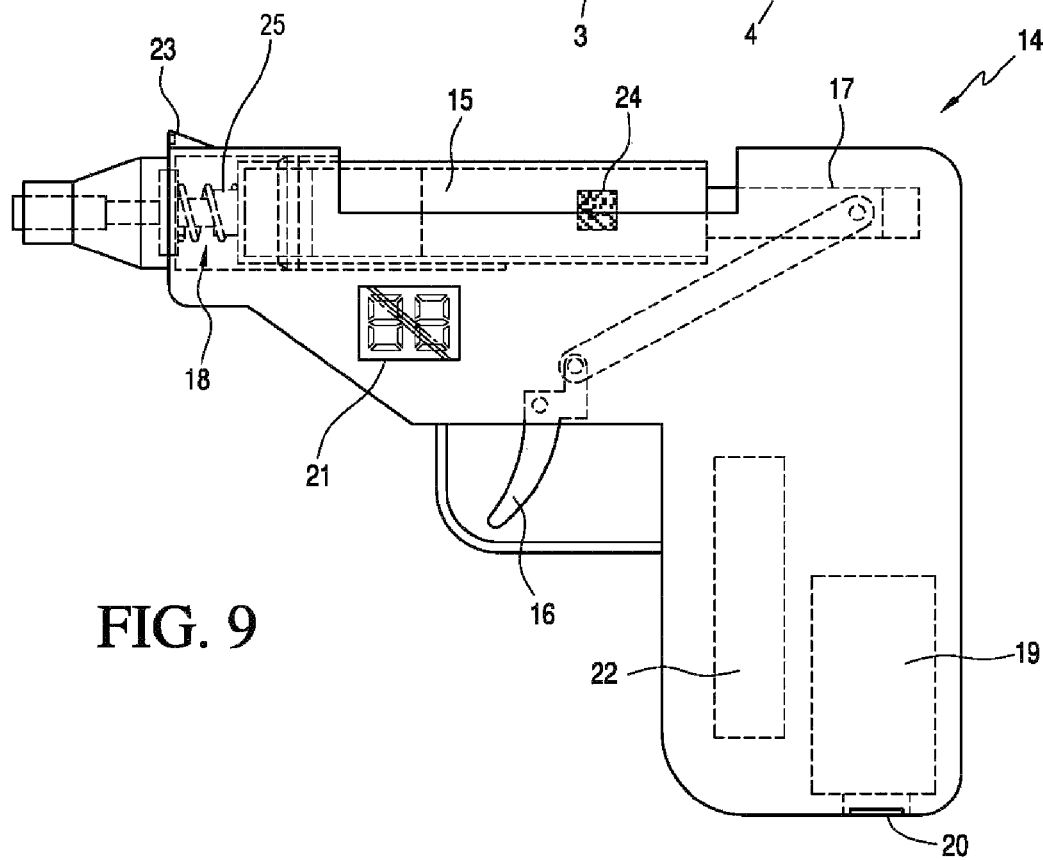
FIG. 9 is a side view of a gun-shaped applicator according to the present invention.

In an embodiment, the applicator may further comprise a display counter. In a syringe, the display counter 13, as shown in FIG. 8, may be mechanical, in which each depression or actuation mechanically advances the counter one digit. In a gun-shaped applicator, the display counter 21, as shown in FIG. 9, may be mechanical or electronic. In a mechanical display counter, the display counter will count the number of applications made, corresponding to the number of times the cartridge has been actuated. A display counter can be reset to 00.

In an embodiment, the cartridge 4 is pre-filled with the fluid intended to be dispensed, and the moveable plug 7 is atop the fluid inside the cartridge 4. When the cartridge 4 is moved towards the tip 2, the pump 9 is actuated, the return spring 10 is compressed, and a precise volume of fluid is released from the cartridge 4 through the pump 9. The precise volume of fluid dispensed is determined by the variable dosing selector 5. Upon release of the cartridge 4, the return spring 10 returns to its starting position, thus seating the valve of pump 9 and not permitting any additional fluid to be dispensed.

The interior of the cartridge 4 is airless. After a desired amount of fluid has been dispensed, the moveable plug 7 moves toward the distal end of the cartridge 4 because of the vacuum effect in the interior of the cartridge 4 resulting from the dispensed fluid.

In another embodiment, a male luer lock located at interchangeable tip 8 of the syringe is connected to a female luer lock (not shown) located on a pass-through delivery device. Exemplary pass-through devices include a second syringe, needles, and other tapered devices suitable for delivering the substance contained within the pre-filled syringe.

The airless syringe and systems disclosed herein provide the ability to use one package or system to deliver multiple, precisely-metered, selectable amounts of fluid. The embodiments disclosed herein may be used for, for example, pesticide delivery, insecticide delivery, fungicide delivery, etc.

A method of using one or more embodiments of the disclosed airless applicator comprises one or more of the following (not necessarily in order):
  inserting a prefilled cartridge into an elongated passageway of the housing of the applicator,
  selecting the desired amount of fluid to be dispensed using the variable amount selector;
  optionally attaching a delivery device (e.g., a tube or hose) to the tip of the applicator (e.g., via an interchangeable tip 8); and
  actuating the pump by sliding the cartridge relative to the housing.

In another embodiment shown in FIG. 9, the applicator is a gun-shaped applicator 14, into which a cartridge 15 may be inserted. As shown in FIG. 9, the gun-shaped applicator 14 features a trigger 16, which, when depressed, moves a lever 17 to slide cartridge 15 to actuate a pump 25 to dispense a desired amount of fluid. A return spring 18 within the body of the gun-shaped device 14 forces the cartridge to back after the fluid is dispensed.

In an embodiment, the gun-shaped applicator 14 shown in FIG. 9 further comprises any combination of the following: a display counter 21; a data capture module 22; a battery 19; a charging port 20; a light source 23; a variable dosing selector (not shown); and an interchangeable tip, including, for example, a luer lock (not shown).

The battery 19 may be any type of rechargeable battery. The charging port 20 allows for the battery to be charged without requiring that the battery be removed.

The data capture module 22 allows for the capture of data pertaining to the device, such as number of doses dispensed, discrete volumetric amounts dispensed, cumulative volumetric amounts dispensed, product applied, time stamp, etc. The data capture module 22 may further comprise a means for remotely transmitting data to a receiving unit such as a data management and/or software system. In an embodiment, the data capture module 22 comprises at least one transmitter selected from the group consisting of BLUETOOTH®, SMS, Wi-Fi or cellular signal or captured on a storage disk (SIM card). The means of transmitting data may be any means which allows for transmission of data to a data management and/or software system.

The display counter 21 displays, for example, the number of doses dispensed. The display counter 21 may be mechanical or electronic. Electronic display counters may comprise an LCD or similar display. Not all data captured by the data capture module 22 will be displayed on the display counter 21.

The cartridge 15 used in the gun-shaped applicator 14 may optionally comprise a label allowing for identification of the cartridge 15. In an embodiment, the cartridge 15 may comprise a product radio frequency ID ("RFID"). This product RFID allows for the cartridge to be identified using devices capable of reading RFIDs.

The cartridge further comprises an auto-sealing port (not shown) at the anterior end of the cartridge. The auto-sealing port is designed to fit exactly to the pump 25 in the housing, which drives the fluid to be dispensed upon actuation of the pump 25. It is a feature of the cartridge's design that the cartridge fit securely into the housing of the applicator, such as the housing of the syringe or gun-shaped applicator.

The gun-shaped applicator 14 disclosed herein further comprises a light source 23. In an embodiment, the light source is an LED light. The light source may aid an operator—e.g., technician—in dispensing the product or substance in, for example, dark places such as cabinets or narrow openings, etc.

The present disclosure has been described with reference to specific details of particular embodiments thereof. It is not intended that such details be regarded as limitations upon the scope of the disclosure except insofar as and to the extent that they are included in the accompanying claims.

In other embodiments of the disclosed subject matter, the interchangeable tip may comprise other appropriate dispensing tip mechanisms that are currently or later become known to those skilled in the art can be fixedly attached to the syringe body. For example, a luer lock can be used at the dispensing tip of the syringe to allow attachment of disposable needles. Other needle connection means, such as threaded fittings, elastomeric plugs, or fitted end caps equally may be used to attach a needle to the end of the syringe. The lower end of the syringe body may be shaped or threaded as required to accommodate the selected needle connection means. A cap or other means (not shown) to hermetically seal the dispensing end of the syringe may be used until the dispensing tip mechanism is connected to the syringe to dispense the substance therein.

Although not specifically illustrated or described herein, one of ordinary skill in the art would appreciate that embodiments of the disclosed airless applicators can further include various components commonly found in applicators, such as, but not limited to, seals, visual markings, connectors for the tip to interface with different components (e.g., needles), and structures for interfacing with machine actuators (e.g., syringe pumps).

In any of the embodiments described herein, the cartridge 4 may be replaced by another cartridge 4, and the applicator may be used again.

Features of the disclosed embodiments may be combined, rearranged, omitted, etc., within the scope of the invention to produce additional embodiments. Furthermore, certain features may sometimes be used to advantage without a corresponding use of other features.

It is thus apparent that there is provided in accordance with the present disclosure, airless applicators and cartridges, and systems and methods using such applicators and cartridges. Many alternatives, modifications, and variations are enabled by the present disclosure. While specific embodiments have been shown and described in detail to illustrate the application of the principles of the present invention, it will be understood that the invention may be embodied otherwise without departing from such principles. Accordingly, Applicants intend to embrace all such alternatives, modifications, equivalents, and variations that are within the spirit and scope of the present invention.

What is claimed is:

1. An applicator comprising:
    a housing with a distal end and a proximal end;
    an interchangeable tip attachable to the distal end of the housing and in fluid communication with an interior of the housing;
    a cartridge, which has a distal end and a proximal end, which is partially or wholly insertable into the housing and which optionally slidably and/or rotatably moves relative to the housing, the cartridge having a pump in fluid communication with the interchangeable tip for dispensing a fluid in the cartridge through the tip by operation of the pump via depressing a trigger which, when depressed, moves a lever to slide the cartridge to actuate the pump to dispense a desired amount of fluid; and
    a variable amount selector at the proximal end of the housing for selecting a predetermined amount of the fluid to be dispensed from the cartridge,
    wherein the cartridge comprises a moveable plug for preventing air from contacting the fluid in the cartridge when the predetermined amount of the fluid is dispensed,
    wherein said variable amount selector comprises a stroke adjuster for varying a length the cartridge slides relative to the housing by rotating the cartridge when it is disposed in the housing, and
    wherein the stroke adjuster comprises
        a plurality of axial grooves of differing lengths at the proximal end of the housing, and
        a protrusion on the cartridge for engaging one of the grooves, and
    the variable amount selector is operated by rotating the cartridge so that, as the cartridge slides in the housing, the protrusion engages and travels in an axial direction within the one of the grooves corresponding to a desired amount of the fluid to be dispensed.

2. The applicator according to claim 1 further comprising a display counter for indicating how much fluid has been dispensed.

3. The applicator according to claim 2, wherein the display counter is mechanical or electronic.

4. The applicator according to claim 1, wherein the cartridge further comprises an auto-sealing port at an anterior end of the cartridge for engaging the pump for allowing the fluid to flow from the cartridge to the pump.

5. The applicator according to claim 1, wherein the cartridge comprises a radio frequency identification label.

6. The applicator according to claim 1, wherein the gun-shaped applicator further comprises a data capture module.

7. The applicator according to claim 1 further comprising a light source.

8. A method of using the applicator according to claim 1, comprising:
    inserting a cartridge prefilled with the fluid into an elongated passageway of the housing of the applicator;
    selecting a desired amount of the fluid to be dispensed using the variable amount selector; and
    actuating the pump by sliding the cartridge.

9. The method according to claim 8, wherein the tip of the applicator has a luer lock connection, and the method further comprises attaching a pass-through delivery device to the luer lock connection.

* * * * *